United States Patent
Otanez et al.

(10) Patent No.: US 8,781,697 B2
(45) Date of Patent: Jul. 15, 2014

(54) ADAPTIVE CONTROL SYSTEMS AND METHODS FOR TRANSMISSION SOLENOIDS

(75) Inventors: Paul G. Otanez, Troy, MI (US); Randall B. Dlugoss, Royal Oak, MI (US)

(73) Assignee: GM Global Technology Operations LLC

( * ) Notice: Subject to any disclaimer, the term of this patent is extended or adjusted under 35 U.S.C. 154(b) by 503 days.

(21) Appl. No.: 13/222,544

(22) Filed: Aug. 31, 2011

(65) Prior Publication Data

US 2013/0049941 A1 Feb. 28, 2013

(51) Int. Cl.
*F16H 61/12* (2010.01)

(52) U.S. Cl.
USPC .......................................................... 701/59

(58) Field of Classification Search
CPC . F16H 61/0021; F16H 61/0202; F16H 61/12; F16H 2059/683
USPC .................................................... 701/59, 60
See application file for complete search history.

(56) References Cited

U.S. PATENT DOCUMENTS

| | | | |
|---|---|---|---|
| 6,577,940 B2* | 6/2003 | Saito et al. ...................... | 701/59 |
| 6,807,472 B2 | 10/2004 | Ford et al. | |
| 7,373,234 B1* | 5/2008 | Hwang et al. ................... | 701/60 |
| 2009/0209383 A1 | 8/2009 | Olson et al. | |
| 2009/0222180 A1* | 9/2009 | Kraenzlein et al. ............. | 701/59 |
| 2009/0254256 A1 | 10/2009 | Dlugoss et al. | |
| 2010/0137093 A1 | 6/2010 | Collins et al. | |
| 2010/0269632 A1 | 10/2010 | Dlugoss | |

* cited by examiner

*Primary Examiner* — Edwin A Young

(57) ABSTRACT

A target pressure module determines a target pressure for controlling a solenoid of a transmission. An error module determines a pressure error based on a difference between the target pressure and a pressure measured using a pressure sensor. A pressure offset module determines a pressure offset using the target pressure and a mapping of pressure offsets indexed by target pressure. An offset learning module selectively determines a learned pressure offset and selectively updates the mapping based on the learned pressure offset. A pressure command module selectively generates a commanded pressure based on the target pressure, the pressure offset, and the pressure error. A solenoid control module controls actuation of the solenoid based on the commanded pressure.

22 Claims, 4 Drawing Sheets

ADAPTIVE CONTROL SYSTEMS AND METHODS FOR TRANSMISSION SOLENOIDS

FIELD

The present disclosure relates to vehicle transmissions and more particularly to transmission solenoid control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque, which is output to a transmission. An automatic transmission of a vehicle may include a plurality of fluid controlled friction devices, such as clutches. A control module may engage and disengage one or more of the clutches according to a predefined pattern to establish different gear ratios (also called speed ratios) within the transmission.

A gear ratio may be defined in terms of a ratio of a transmission input shaft speed divided by a transmission output shaft speed. A gear shift from one gear ratio to another gear ratio involves disengaging a first clutch that is associated with the current or actual gear ratio, and engaging a second clutch associated with a next gear ratio. The clutch to be disengaged during the gear shift is referred to as the offgoing clutch, and the clutch to be engaged during the gear shift is referred to as the oncoming clutch.

SUMMARY

A target pressure module determines a target pressure for controlling a solenoid of a transmission. An error module determines a pressure error based on a difference between the target pressure and a pressure measured using a pressure sensor. A pressure offset module determines a pressure offset using the target pressure and a mapping of pressure offsets indexed by target pressure. An offset learning module selectively determines a learned pressure offset and selectively updates the mapping based on the learned pressure offset. A pressure command module selectively generates a commanded pressure based on the target pressure, the pressure offset, and the pressure error. A solenoid control module controls actuation of the solenoid based on the commanded pressure.

A method for a vehicle includes: determining a target pressure for controlling a solenoid of a transmission; determining a pressure error based on a difference between the target pressure and a pressure measured using a pressure sensor; determining a pressure offset using the target pressure and a mapping of pressure offsets indexed by target pressure; selectively determining a learned pressure offset; selectively updating the mapping based on the learned pressure offset; selectively generating a commanded pressure based on the target pressure, the pressure offset, and the pressure error; and controlling actuation of the solenoid based on the commanded pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
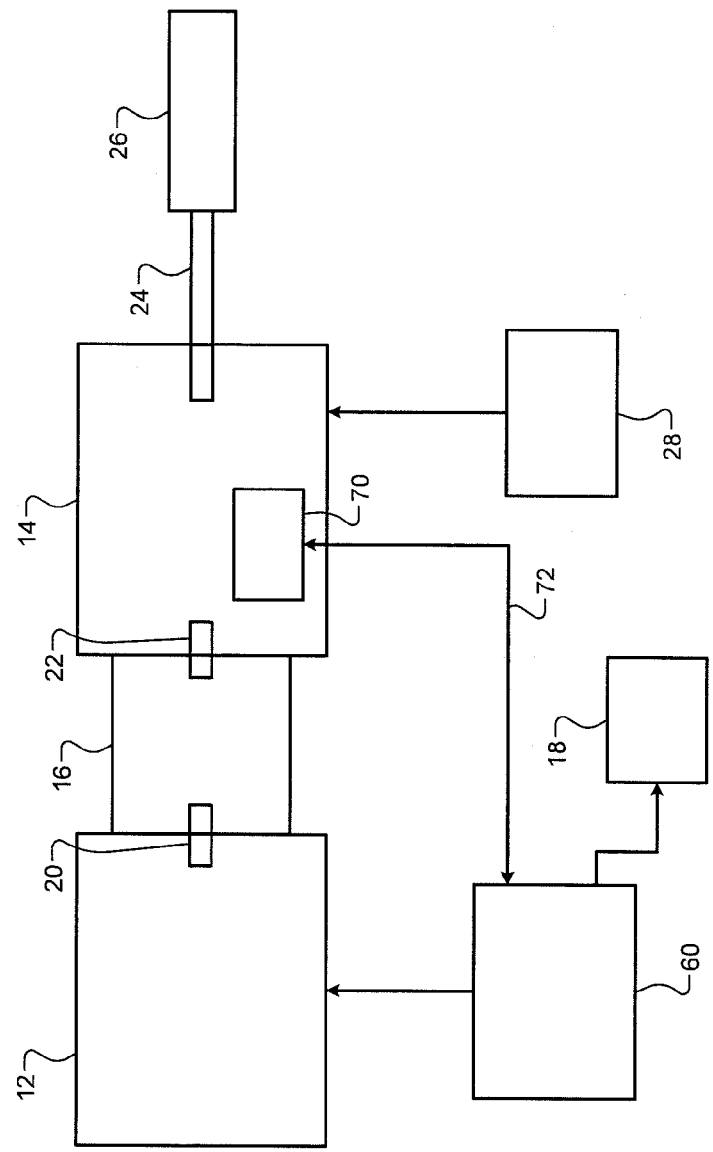
FIG. 1 is a functional block diagram of an example vehicle system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A pump pumps transmission oil from a transmission oil source (e.g., a sump) to a valve body and to a torque converter. The transmission oil flows between the valve body and one or more clutches of a transmission. One or more clutch control solenoids regulate the flow of transmission oil from the valve body to the one or more clutches. One or more line pressure regulator solenoids regulate the flow of transmission oil back to the source from the valve body and from the torque converter.

A control module (e.g., a transmission control module) determines a target pressure for a solenoid of the transmission. The control module determines a pressure offset based on the target pressure and determines an open-loop pressure based on the pressure offset and the target pressure. The control module determines the pressure offset using a mapping of pressure offsets indexed by target pressure.

The control module also determines a pressure error based on a difference between a pressure measured using a pressure sensor and the target pressure. The control module determines an integral term based on the time history of the pressure error and determines a closed-loop adjustment as a function of the integral term. The control module determines a commanded pressure based on the closed-loop adjustment and the open-loop pressure and controls actuation of the solenoid based on the commanded pressure.

The control module of the present disclosure selectively updates the mapping of pressure offsets indexed by target pressure. More specifically, the control module determines a learned pressure offset based on the integral term and updates the mapping with the learned pressure offset. Learning and updating the mapping may enable the pressure error to decrease and provide one or more other benefits.

Referring now to FIG. 1, a functional block diagram of an example vehicle system 10 is presented. An internal combustion engine 12 drives a transmission 14 via a torque converter 16. The engine 12 may include, for example, a spark-combustion type engine, a compression-combustion type engine, and/or another suitable type of engine. A vehicle may also include one or more electric motors and/or motor generator units (MGUs) 18.

The engine 12 outputs torque to the torque converter 16 via an engine output shaft 20, such as a crankshaft. The torque converter 16 supplies torque to the transmission 14 via a transmission input shaft 22. While the transmission 14 will be discussed as including a clutch-to-clutch type transmission, the transmission 14 may include another type of transmission, such as a dual clutch transmission (DCT) or another suitable type of transmission.

The transmission 14 may include one or more gearsets (not shown) through which torque may be transferred between the transmission input shaft 22 and a transmission output shaft 24. The transmission output shaft 24 drives a driveline 26 of the vehicle system 10, and the driveline 26 transfers torque to wheels (not shown) of the vehicle.

A range selector 28 enables a user to select a mode of operation of the transmission 14. The mode may include, for example, a park mode, a reverse mode, a neutral mode, or one or more forward drive modes. The transmission 14 may be capable of achieving a plurality of gear ratios. For example only, the transmission 14 may be capable of achieving six forward gear ratios, a reverse gear ratio, and a neutral gear ratio. The transmission 14 may be capable of achieving a greater or lesser number of forward gear ratios and/or a greater number of reverse gear ratios in various implementations. A gear ratio may be defined as the ratio between the rotational speed of the transmission input shaft 22 and the rotational speed of the transmission output shaft 24.

An engine control module (ECM) 60 controls operation of the engine 12. The ECM 60 or another control module (not shown) may control operation of the one or more MGUs 18 in various implementations. A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data via a connection 72.

Figure 2:
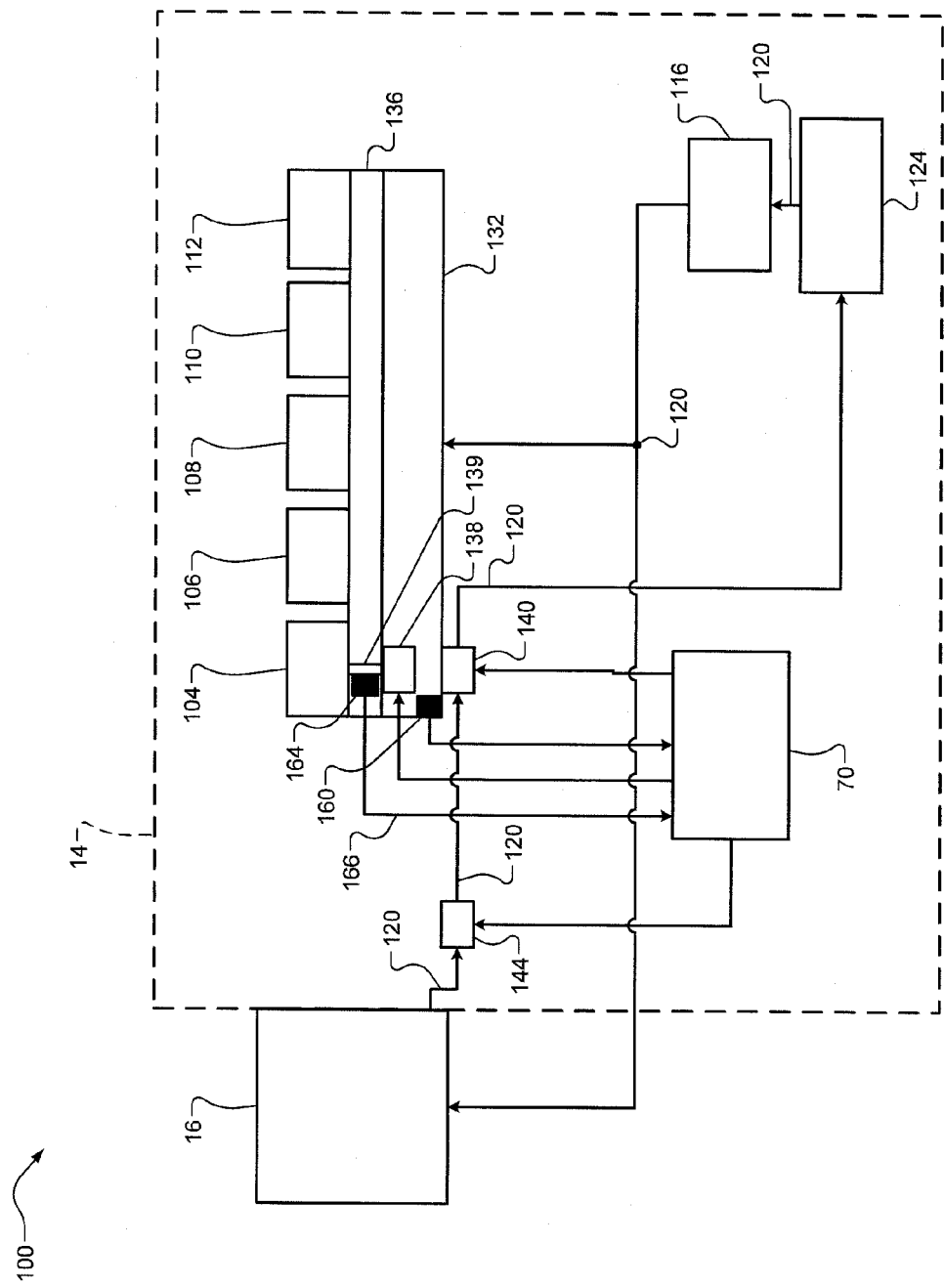
FIG. 2 is a functional block diagram of an example transmission system according to the principles of the present disclosure.

Referring now to FIG. 2, a functional block diagram of an example implementation of a transmission system 100 is presented. The transmission 14 includes a plurality of clutches, such as first, second, third, fourth, and fifth clutches 104, 106, 108, 110, and 112, respectively. The transmission 14 may include a greater or fewer number of clutches. The first, second, third, fourth, and fifth clutches 104-112 will be collectively referred to hereafter as the clutches 104-112.

The clutches 104-112 control which one of the gear sets is engaged within the transmission 14 at a given time. In other words, the clutches 104-112 control the gear ratio at a given time. Different gear ratios may be established when different combinations of one or more of the clutches 104-112 and gear sets are engaged. An example table of clutch engagement combinations that may establish various gear ratios is provided below.

| Gear Ratio/ | Clutches Engaged | | | | |
| --- | --- | --- | --- | --- | --- |
| Range | 30 | 32 | 34 | 36 | 38 |
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

For example only, a first forward gear ratio may be established when the first and fifth clutches 104 and 112 are engaged. A second forward gear ratio may be established when the first and fourth clutches 104 and 110 are engaged. A third forward gear ratio may be established when the first and third clutches 104 and 108 are engaged. A fourth forward gear ratio may be established when the first and second clutches 104 and 106 are engaged. A fifth forward gear ratio may be established when the second and third clutches 106 and 108 are engaged. A sixth forward gear ratio may be established when the second and fourth clutches 106 and 110 are engaged. The reverse gear ratio may be established when the third and fifth clutches 108 and 112 are engaged. The neutral gear ratio may be established when only the fifth clutch 112 is engaged. As the numerical title attributed to the forward gear ratios increases, the gear ratio (i.e., ratio of transmission input speed over transmission output speed) decreases. For example only, the gear ratio associated with the first forward gear ratio is greater than the gear ratio associated with the second gear ratio.

A gear shift between successive forward gear ratios may be accomplished by disengaging a first one of the clutches 104-112 and engaging a second one of the clutches 104-112 while maintaining the engagement of a third one of the clutches 104-112. The engagement and the disengagement of the first and second ones of the clutches 104-112 may be performed in concert.

For example only, a gear shift from the first forward gear ratio to the second forward gear ratio may be accomplished by disengaging the fifth clutch 112, engaging the fourth clutch 110, and maintaining the engagement of the first clutch 104. A gear shift from the second forward gear ratio to the third forward gear ratio may be accomplished by disengaging the fourth clutch 110, engaging the third clutch 108, and maintaining the engagement of the first clutch 104. A gear shift from the third forward gear ratio to the fourth forward gear ratio may be accomplished by disengaging the third clutch 108, engaging the second clutch 106, and maintaining the engagement of the first clutch 104. A gear shift from the fourth forward gear ratio to the fifth forward gear ratio may be accomplished by disengaging the first clutch 104, engaging the third clutch 108, and maintaining the engagement of the second clutch 106. A gear shift from the fifth forward gear ratio to the sixth forward gear ratio may be accomplished by disengaging the third clutch 108, engaging the fourth clutch 110, and maintaining the engagement of the second clutch 106. In various implementations, more than two torque transmitting devices may be engaged to achieve a gear ratio.

Transmission oil 120 or another suitable fluid is directed to and from ones of the clutches 104-112 to control engagement and disengagement of the ones of the clutches 104-112. A pump 116 draws the transmission oil 120 from a sump 124 or another suitable transmission oil source. The pump 116 pressurizes the transmission oil 120 and provides pressurized transmission oil to a valve body 132 and to the torque converter 16.

The valve body 132 includes one or more clutch control solenoids, such as clutch control solenoid 138, that control the flow of the transmission oil 120 from the valve body 132 to ones of the clutches 104-112 and vice versa. The transmission oil 120 flows between the valve body 132 and ones of the clutches 104-112 via passages formed in a clutch plate 136. For example only, the clutch control solenoid 138 may control the flow of the transmission oil 120 between the valve body 132 and the first clutch 104 via passage 139. One or more clutch control solenoids may be provided for each of the clutches 104-112.

One or more line pressure regulator solenoids, such as line pressure regulator solenoid 140, control the flow of the transmission oil 120 from the valve body 132 (at a relatively higher pressure) back to the sump 124 (at a relatively lower pressure). By controlling the flow of the transmission oil 120 back to the sump 124, the line pressure regulator solenoids also control the pressure of the transmission oil 120 provided to the clutch control solenoids. For example only, the line pressure regulator solenoid 140 may control the pressure of the transmission oil 120 provided to the clutch control solenoid 138. One or more line pressure regulator solenoids may be provided for each of the clutch control solenoids.

As stated above, the pump 116 also provides the transmission oil 120 to the torque converter 16. More specifically, the pump 116 may provide the transmission oil 120 to a clutch (not shown) of the torque converter 16. Opening of a feed valve 144 may control the flow of the transmission oil 120 from the torque converter 16 to the line pressure regulator solenoids or to the valve body 132. The TCM 70 may control the feed valve 144. The line pressure regulator solenoids may also allow some of the transmission oil 120 to bleed from the torque converter 16 (at a relatively higher pressure) back to the sump 124 (at a relatively lower pressure).

The TCM 70 controls the pressure of the transmission oil 120 provided to each of the clutches 104-112 to control the gear ratio engaged within the transmission 14, to control shifts between two gear ratios (i.e., gear shifts), and to control one or more other operations. The TCM 70 controls the pressure of the transmission oil 120 provided to the clutches 104-112 via the line pressure regulator solenoids and the clutch control solenoids.

The transmission 14 may include one or more pressure sensors. For example only, a line pressure sensor 160 may measure a pressure of the transmission oil 120 provided to the clutch control solenoid 138. The TCM 70 may control the line pressure regulator solenoid 140 to adjust the pressure of the transmission oil 120 provided to the clutch control solenoid 138 toward a target line pressure. The pressure of the transmission oil 120 provided to the clutch control solenoid 138 will be referred to as a line pressure.

A clutch pressure sensor 164 may measure a pressure of the transmission oil 120 provided to the first clutch 104 by the clutch control solenoid 138. The TCM 70 may control the clutch control solenoid 138 to adjust the pressure of the transmission oil 120 provided to the first clutch 104 toward a target clutch pressure. The pressure of the transmission oil 120 provided to the first clutch 104 will be referred to as a clutch pressure 166. The transmission 14 may include one or more additional line pressure sensors and/or one or more additional clutch pressure sensors.

Figure 3:
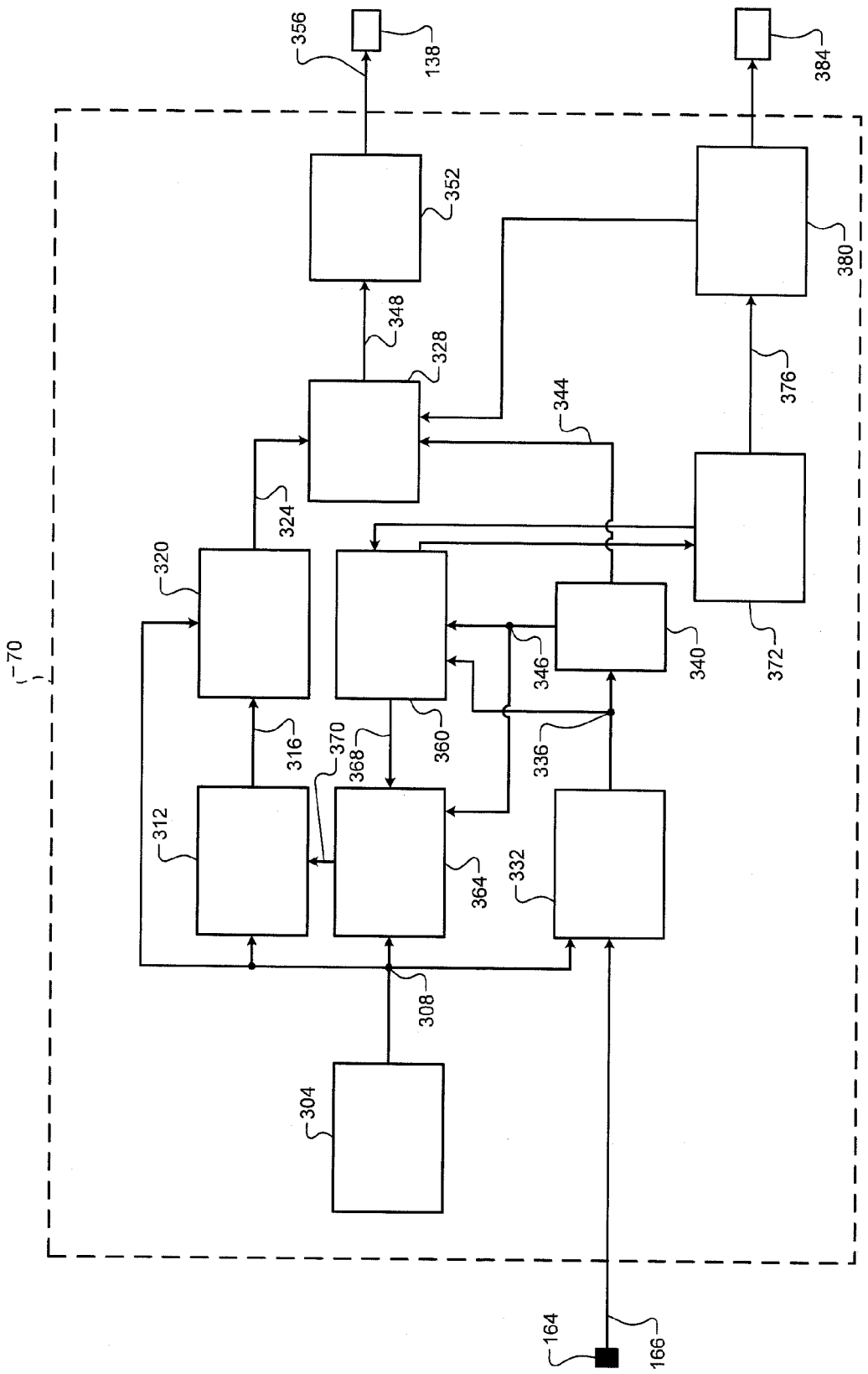
FIG. 3 is a functional block diagram of an example solenoid control system according to the present disclosure.

Referring now to FIG. 3, a functional block diagram of an example solenoid control system is presented. While control of the clutch control solenoid 138 will be discussed, the following is applicable to other solenoids of the transmission 14 including other clutch control solenoids, the line pressure regulator solenoid 140, other line pressure regulator solenoids, and other solenoids implemented in the transmission 14.

A target pressure module 304 determines a target pressure 308. The target pressure 308 may be a target (desired) value for the clutch pressure 166 measured using the clutch pressure sensor 164. A pressure offset module 312 determines a pressure offset 316 based on the target pressure 308. For example only, the pressure offset module 312 may determine the pressure offset 316 using a mapping of values for the pressure offset 316 indexed by values for the target pressure 308.

An open-loop (OL) pressure module 320 determines an OL pressure 324 based on the pressure offset 316 and the target pressure 308. For example only, the OL pressure module 320 may set the OL pressure 324 equal to the sum of the target pressure 308 and the pressure offset 316. The OL pressure module 320 provides the OL pressure 324 to a pressure command module 328. The pressure command module 328 is discussed further below.

An error module 332 receives the clutch pressure 166 measured using the clutch pressure sensor 164 and receives the target pressure 308. The error module 332 determines a pressure error 336 as a function of the clutch pressure 166 and the target pressure 308. For example only, the error module 332 may set the pressure error 336 equal to the target pressure 308 minus the clutch pressure 166.

A proportional, integral, derivative (PID) module 340 determines a closed-loop (CL) adjustment 344 based on the pressure error 336. More specifically, the PID module 340 determines the CL adjustment as a function of the pressure error 336. The PID module 340 may, for example, determine a proportional term (not shown), an integral term 346, and a derivative term (not shown) as functions of the pressure error 336. The PID module 340 may generate the CL adjustment 344 based on the proportional term, the integral term 346, and the derivative term. The PID module 340 may set the CL adjustment 344 equal to the sum of the proportional term, the integral term 346, and the derivative term. In various implementations, a proportional, integral module (PI) module may be used to generate the CL adjustment 344 based on the pressure error 336. In various implementations, another suitable closed-loop controller that utilizes an integral term to minimize or eliminate steady-state tracking error may be used.

The pressure command module 328 receives the OL pressure 324 and the CL adjustment 344. The pressure command module 328 generates a commanded pressure 348 based on the OL pressure 324 and the CL adjustment 344. For example only, the pressure command module 328 may set the commanded pressure 348 equal to the sum of the OL pressure 324 and the CL adjustment 344.

A solenoid control module 352 actuates the clutch control solenoid 138 based on the commanded pressure 348. The solenoid control module 352 may generate a signal 356 as a function of the commanded pressure 348 and apply the signal 356 to the clutch control solenoid 138. For example only, the signal 356 may include a pulse width modulation (PWM) signal or another suitable type of signal.

A triggering module 360 selectively triggers (enables) and disables an offset learning module 364. The triggering module 360 may trigger and disable the offset learning module 364 using a triggering signal 368. For example only, the triggering module 360 may set the triggering signal 368 to an active state to trigger the offset learning module 364 and to an inactive state to disable the offset learning module 364.

The triggering module 360 may selectively trigger and disable the offset learning module 364 based on the integral term 346 and the pressure error 336. For example only, the triggering module may disable the offset learning module 364 when the pressure error 336 is less than a first predetermined pressure, the integral term 346 is less than a second predetermined pressure, and/or a fault is present in the system. The first and second predetermined pressures may be calibrated values. The triggering module may disable the offset learning module 364 when the pressure error 336 is greater than the first predetermined pressure and the integral term 346 is greater than the second predetermined pressure. The triggering module may trigger the offset learning module 364 when the pressure error 336 is less than a predetermined value and the integral term 346 is greater than a second predetermined value.

When triggered, the offset learning module 364 determines a learned pressure offset 370 based on the integral term 346. For example only, in the simplest case, the offset learning module 364 may set the learned pressure offset 370 equal to the integral term 246. For another example only, the offset learning module 364 may determine the learned pressure offset 370 using one of a function and a mapping that relates the integral term 346 to the learned pressure offset 370. The offset learning module 364 updates the mapping used by the pressure offset module 312 with the learned pressure offset 370, based on the target pressure 308. For example only, the offset learning module 364 determines the entry of the mapping corresponding to the target pressure 308 and updates the mapped value of the pressure offset 316 to the learned pressure offset 370.

Updating the mapping based on the learned pressure offset 370 allows the learned pressure offset 370 to be used (as the pressure offset 316) in the future for controlling the clutch control solenoid 138. Accordingly, the pressure error 336 may decrease. As the pressure error 336 decreases, the control effort associated with calculating the CL adjustment 344 also decreases. Additionally, if the clutch control solenoid 138 has a fault and the CL adjustment 344 cannot be used in determining the commanded pressure 348, the pressure command module 328 may be able to more closely achieve the target pressure 308 because the OL pressure 324 will be more accurate.

When the pressure error 336 is greater than the first predetermined pressure and the integral term 346 is greater than the second predetermined pressure, the triggering module 360 may trigger a fault detection module 372. In various implementations, the triggering module 360 may wait until the integral term 346 has been greater than the second predetermined pressure for at least a predetermined period before triggering the fault detection module 372.

When triggered, the fault detection module 372 may execute one or more functions to determine whether a fault is present in the clutch control solenoid 138. When a fault is present in the clutch control solenoid 138, the fault detection module 372 may generate a fault indicator 376. For example only, the fault detection module 372 may set a predetermined code (e.g., a diagnostic trouble code or DTC) in memory (not shown) when a fault is present in the clutch control solenoid 138. When a fault is present in the clutch control solenoid 138, the fault detection module 372 may also report that the fault is present to the triggering module 360 such that the triggering module 360 can disable the offset learning module 364.

A monitoring module 380 may monitor the memory and activate a malfunction indicator lamp (MIL) 384 and/or take one or more remedial actions when a fault is present in the clutch control solenoid 138. An example of a remedial action may include commanding the pressure command module 328 to refrain from determining the commanded pressure 348 based on the CL adjustment 344. The pressure command module 328 may then set the commanded pressure 348 in open-loop based on or to the OL pressure 324.

Figure 4:
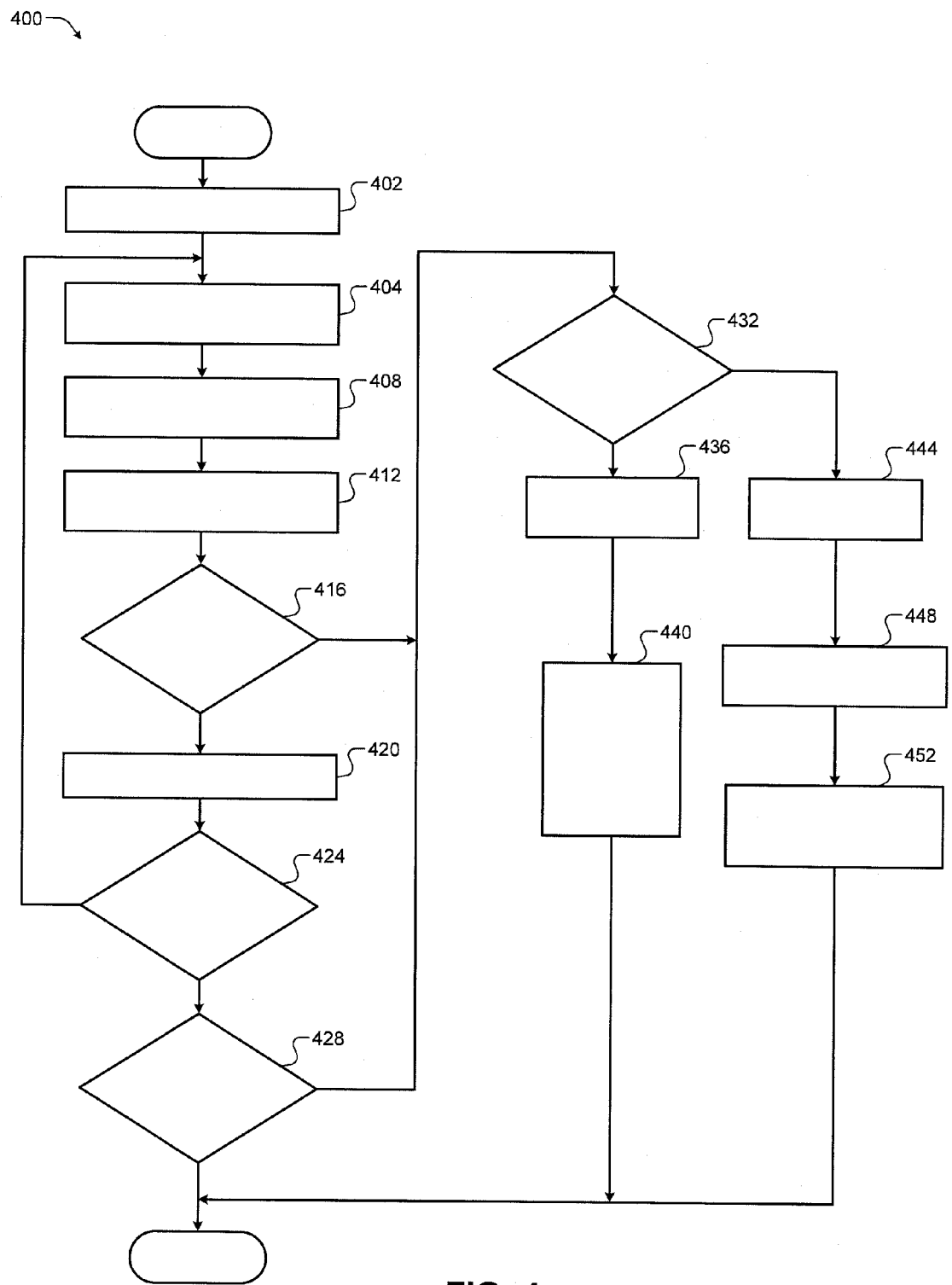
FIG. 4 is a flowchart depicting an example method for updating a mapping used to determine a pressure offset and for controlling a solenoid of a transmission according to the present disclosure.

Referring now to FIG. 4, a flowchart depicting an example method 400 for updating the mapping used to determine the pressure offset 316 is presented. Control may begin with 402 where control resets a timer value (k) to zero. At 404, control determines the target pressure 308 and obtains the clutch pressure 166. The clutch pressure 166 may be measured using the clutch pressure sensor 164.

At 408, control determines the pressure error 338 based on the difference between the target pressure 308 and the clutch pressure 166. Control determines the CL adjustment 344 based on the pressure error 338 at 412. Control determines the integral term 346 based on the pressure error 338 and determines the CL adjustment 344 as a function of the integral term 346. Control may determine the CL adjustment 344 using any suitable closed-loop feedback controller, such as a PID module, that uses an integral term to minimize or eliminate steady-state tracking errors.

At 416, control may determine whether the timer value (k) is greater than a predetermined timer value (corresponding to a predetermined period. If true, control may transfer to 432, which is discussed further below. If false, control may continue with 420. This may allow control to allow a predetermined period for the pressure error 420 to decrease and, if the pressure error 420 does not decrease, to determine whether a fault is present (at 432). Control increments the timer value (e.g., set k=k+1) at 420, and control continues with 424.

Control determines whether the pressure error 336 is less than the first predetermined pressure at 424. If true, control proceeds with 428; if false, control may return to 404. At 428, control determines whether the integral term 346 is greater than the second predetermined pressure. If false, control may end. If true, control transfers to 432.

At 432, control determines whether the integral term 346 is greater than a third predetermined pressure. The third predetermined pressure is different than the second predetermined pressure. If true, control generates the fault indicator 376 to indicate that a fault is present in the clutch control solenoid 138 at 436, and control continues with 440. If false, control continues with 444. Control may perform one or more remedial actions at 440, and control may end. Remedial actions include, for example, activating the MIL 384, setting a predetermined diagnostic trouble code (DTC), and disabling use of the CL adjustment 344 in determining the commanded pressure 348. When use of the CL adjustment 344 in determining the commanded pressure 348 is disabled, control may set the commanded pressure 348 based on or equal to the OL pressure 324.

At 444, control generates the fault indicator 376 to indicate that the fault is not present in the clutch control solenoid 138. Control determines the learned pressure offset 370 based on the integral term 346 at 448. For example only, control may determine the learned pressure offset 370 using one of a function and a mapping that relates the integral term 346 to the learned pressure offset 370. Control updates the mapping of values of the pressure offset 316 indexed by values of the target pressure 308 with the learned pressure offset 370 at 452, and control may end. More specifically, control may update the value of the pressure offset 316 corresponding to the target pressure 308 with the learned pressure offset 370. While control is shown as ending after 428, 440, and 452, the method 400 may be illustrative of one control loop and control may return to 404.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a target pressure module that determines a target pressure for controlling a solenoid of a transmission;
an error module that determines a pressure error based on a difference between the target pressure and a pressure measured using a pressure sensor;
a pressure offset module that determines a pressure offset using the target pressure and a mapping of pressure offsets indexed by target pressure;
an offset learning module that selectively determines a learned pressure offset and that selectively updates the mapping based on the learned pressure offset;
a pressure command module that selectively generates a commanded pressure based on the target pressure, the pressure offset, and the pressure error; and
a solenoid control module that controls actuation of the solenoid based on the commanded pressure.

2. The system of claim 1 further comprising a triggering module that triggers the offset learning module to determine the learned pressure offset and selectively update the mapping when the pressure error is less than a predetermined pressure.

3. The system of claim 2 further comprising a proportional integral derivative (PID) module that generates an integral term based on the pressure error and that generates a closed-loop adjustment as a function of the integral term,
wherein the triggering module triggers the offset learning module to determine the learned pressure offset and selectively update the mapping when the pressure error is less than the predetermined pressure and the integral term is greater than a second predetermined pressure.

4. The system of claim 3 further comprising a fault detection module that, when triggered, determines whether a fault is present in the solenoid,
wherein the triggering module triggers the fault detection module when at least one of:
(i) the pressure error is less than the predetermined pressure and the integral term is greater than the second predetermined pressure; and (ii) a timer value corresponds to greater than a predetermined period and the pressure error is greater than the predetermined pressure at the end of the predetermined period.

5. The system of claim 4 further comprising a monitoring module that activates a malfunction indicator lamp when the fault is present in the solenoid.

6. The system of claim 4 wherein the triggering module selectively disables the offset learning module when the fault is present in the solenoid.

7. The system of claim 4 further comprising:
a proportional integral derivative (PID) module that determines a closed-loop adjustment as a function of the pressure error; and
an open-loop pressure module that determines an open-loop pressure as a function of the pressure offset and the target pressure,
wherein, when the fault is present, the pressure command module disables use of the closed-loop adjustment and determines the commanded pressure as a function of the open-loop pressure.

8. The system of claim 1 further comprising:
a proportional integral derivative (PID) module that determines a closed-loop adjustment as a function of the pressure error; and
an open-loop pressure module that determines an open-loop pressure as a function of the pressure offset and the target pressure,
wherein the pressure command module determines the commanded pressure as a function of the closed-loop adjustment and the open-loop pressure.

9. The system of claim 8 wherein the open-loop pressure module sets the open-loop pressure equal to the pressure offset plus the target pressure.

10. The system of claim 8 wherein the pressure command module selectively sets the commanded pressure equal to the closed-loop adjustment plus the open-loop pressure.

11. The system of claim 1 wherein the solenoid is one of a line pressure regulator solenoid and a clutch control solenoid.

12. A method for a vehicle, comprising:
determining a target pressure for controlling a solenoid of a transmission;
determining a pressure error based on a difference between the target pressure and a pressure measured using a pressure sensor;
determining a pressure offset using the target pressure and a mapping of pressure offsets indexed by target pressure;
selectively determining a learned pressure offset;
selectively updating the mapping based on the learned pressure offset;
selectively generating a commanded pressure based on the target pressure, the pressure offset, and the pressure error; and
controlling actuation of the solenoid based on the commanded pressure.

13. The method of claim 12 further comprising, when the pressure error is less than a predetermined pressure, triggering the determining of the learned pressure offset and triggering the updating of the mapping.

14. The method of claim 13 further comprising:
generating an integral term based on the pressure error;
generating a closed-loop adjustment as a function of the integral term; and
when the pressure error is less than the predetermined pressure and the integral term is greater than a second predetermined pressure, triggering the determining of the learned pressure offset and triggering the updating of the mapping.

15. The method of claim 14 further comprising determining whether a fault is present in the solenoid when at least one of:
   (i) the pressure error is less than the predetermined pressure and the integral term is greater than the second predetermined pressure; and
   (ii) a timer value corresponds to greater than a predetermined period and the pressure error is greater than the predetermined pressure at the end of the predetermined period.

16. The method of claim 15 further comprising activating a malfunction indicator lamp when the fault is present in the solenoid.

17. The method of claim 15 further comprising selectively disabling the determining of the learned pressure offset when the fault is present in the solenoid.

18. The method of claim 15 further comprising:
   determining a closed-loop adjustment as a function of the pressure error;
   determining an open-loop pressure as a function of the pressure offset and the target pressure; and,
   when the fault is present, disabling use of the closed-loop adjustment and determining the commanded pressure as a function of the open-loop pressure.

19. The method of claim 12 further comprising:
   determining a closed-loop adjustment as a function of the pressure error;
   determining an open-loop pressure as a function of the pressure offset and the target pressure; and
   determining the commanded pressure as a function of the closed-loop adjustment and the open-loop pressure.

20. The method of claim 19 further comprising setting the open-loop pressure equal to the pressure offset plus the target pressure.

21. The method of claim 19 further comprising selectively setting the commanded pressure equal to the closed-loop adjustment plus the open-loop pressure.

22. The method of claim 12 wherein the solenoid is one of a line pressure regulator solenoid and a clutch control solenoid.

* * * * *